US011307966B2

(12) United States Patent
Odnopozov et al.

(10) Patent No.: US 11,307,966 B2
(45) Date of Patent: Apr. 19, 2022

(54) SHARED SOFTWARE DEBUGGING SERVICE

(71) Applicant: Red Hat, Inc., Raleigh, NC (US)

(72) Inventors: Boris Odnopozov, Ariel (IL); Mordechay Asayag, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/841,077

(22) Filed: Apr. 6, 2020

(65) Prior Publication Data

US 2021/0311854 A1 Oct. 7, 2021

(51) Int. Cl.
*G06F 9/44* (2018.01)
*G06F 11/36* (2006.01)
*G06F 9/54* (2006.01)

(52) U.S. Cl.
CPC .............. *G06F 11/366* (2013.01); *G06F 9/54* (2013.01); *G06F 11/3636* (2013.01); *G06F 11/3644* (2013.01)

(58) Field of Classification Search
CPC ............................................. G06F 11/36–3696
USPC ......................................................... 717/129
See application file for complete search history.

(56) References Cited

U.S. PATENT DOCUMENTS

| | | | |
|---|---|---|---|
| 8,595,702 B2 | 11/2013 | Maybee et al. | |
| 8,739,133 B2 * | 5/2014 | Gritter | G06F 11/3636 717/127 |
| 8,756,577 B2 * | 6/2014 | Bates | G06F 11/362 717/125 |
| 8,990,775 B2 * | 3/2015 | Bates | G06F 11/3664 717/125 |
| 9,032,374 B2 * | 5/2015 | Munson | G06F 11/3624 717/129 |
| 9,092,211 B2 | 7/2015 | Ng et al. | |
| 9,251,040 B2 * | 2/2016 | Cai | G06F 11/3664 |
| 9,262,300 B1 * | 2/2016 | Haba | G06F 11/362 |
| 9,632,913 B2 * | 4/2017 | Deakin | G06F 11/3644 |
| 10,095,605 B2 * | 10/2018 | Vecera | G06F 11/364 |
| 10,261,885 B2 * | 4/2019 | Tucker | G06F 11/3636 |
| 10,795,801 B2 * | 10/2020 | Raviv | G06F 8/33 |
| 11,080,164 B2 * | 8/2021 | Raviv | G06F 11/3624 |

(Continued)

FOREIGN PATENT DOCUMENTS

KR    101390220 B1    4/2014

OTHER PUBLICATIONS

Fabio Petrillo et al. "Swarm debugging: The collective intelligence on interactive debugging"—The Journal of Systems and Software 153 (2019) 152-174.*

(Continued)

*Primary Examiner* — Francisco J Aponte
(74) *Attorney, Agent, or Firm* — Kilpatrick Townsend & Stockton LLP

(57) ABSTRACT

A shared debugging service stores information captured during software debug sessions for future use. The information can include developer identities so that future developers can contact past developers for assistance. The information can also include information such as developer steps, user settings, path-to-current code specifics, and stored breakpoint values. A developer can request a record of previous software debug sessions for a given piece of software and can acquire, store, or display previously collected information to assist in a current software debug session.

17 Claims, 4 Drawing Sheets

(56) References Cited

U.S. PATENT DOCUMENTS

| | | | |
|---|---|---|---|
| 2008/0127119 A1 | 5/2008 | Kasman | |
| 2012/0117541 A1* | 5/2012 | Bates | G06F 8/71 717/125 |
| 2013/0326497 A1* | 12/2013 | Boxall | G06F 11/3632 717/175 |
| 2014/0359573 A1* | 12/2014 | Ajith Kumar | G06F 40/143 717/113 |
| 2015/0143344 A1* | 5/2015 | Davis | G06F 11/3636 717/129 |
| 2016/0203072 A1* | 7/2016 | Boxall | G06F 8/30 717/128 |
| 2016/0282408 A1* | 9/2016 | Langevin | G06F 11/27 |
| 2016/0292061 A1* | 10/2016 | Marron | G06F 11/3636 |
| 2018/0024911 A1* | 1/2018 | Kruszewski | G06F 11/3664 717/125 |
| 2018/0060215 A1* | 3/2018 | Mola | G06F 11/3636 |
| 2018/0089060 A1* | 3/2018 | Craggs | G06F 11/3664 |
| 2018/0173612 A1* | 6/2018 | Law | G06F 11/302 |
| 2018/0260306 A1* | 9/2018 | Carey | G06F 11/3664 |
| 2018/0322031 A1* | 11/2018 | Tamm | G06F 8/70 |
| 2019/0018759 A1* | 1/2019 | Keinan | G06F 11/362 |
| 2019/0213355 A1* | 7/2019 | Raviv | G06F 8/33 |
| 2019/0278694 A1* | 9/2019 | Tucker | G06F 11/3664 |
| 2019/0340103 A1* | 11/2019 | Nelson | G06F 11/3636 |
| 2019/0369849 A1* | 12/2019 | Gonzalez | G06F 9/4881 |
| 2019/0370148 A1* | 12/2019 | Du | G06F 11/3466 |
| 2020/0142805 A1* | 5/2020 | Joglekar | G06F 11/3636 |
| 2021/0064364 A1* | 3/2021 | Culibrk | G06F 8/77 |

OTHER PUBLICATIONS

Eduardo A. Fontana et al. "Visualizing sequences of debugging sessions using Swarm Debugging"; IEEE/ACM 27th International Conference on Program Comprehension (ICPC)—May 25-26, 2019.*
"First look at the Visual Studio Debugger," Microsoft, 2019, https://docs.microsoft.com/en-us/visualstudio/debugger/debugger-feature-tour?view=vs-2019.
Petrillo, F., et al., "Towards Understanding Interactive Debugging," IEEE International Conference on Software Quality, Reliability and Security, 2016, https://ieeexplore.ieee.org/document/7589795.
Tolksdorf, S., et al., "Interactive Metamorphic Testing of Debuggers," TU Darmstadt, 2019, https://software-lab.org/publications/issta2019.pdf.

* cited by examiner

SHARED SOFTWARE DEBUGGING SERVICE

TECHNICAL FIELD

The present disclosure relates generally to debugging computer software. More specifically, but not by way of limitation, this disclosure relates to collecting, storing, and retrieving software debugging information.

BACKGROUND

Computer software often includes code libraries and software modules that are reused over time. When new software is written or existing software is updated, the existing software components may be modified and subsequently debugged for the final software product to be fully functional. Debugging can be accomplished by a debugger that is sometimes part of a software development tool called an integrated development environment (IDE). Examples of an IDE include Microsoft's Visual Studio® Code, JetBrain's IntelliJ® IDEA, and the Eclipse IDE for Java Developers.

During debugging, a developer can refer to data and information about the software and the execution of the software. For example, a developer can use breakpoints to pause a running program in a specific code line. The debugger can show status details and other information about the code for the execution to the breakpoint. For instance, some debuggers can display the values of the variables stored in memory during execution at the breakpoint. Viewing such information during the debugging process can assist a developer in locating and correcting problems with the software.

DETAILED DESCRIPTION

In an integrated development environment (IDE) debugger, information collected during a software debug session, including breakpoint values, can be displayed in a window of the user interface. Such information can be displayed for reference during the debugging process and then deleted so that information from the next software debug session is displayed. The next software debug session may or may not be directed to the same software component. Future developers debugging the same software component are unable to access information from past software debug sessions. The accumulated knowledge and experience (e.g., possible values, flows and outputs) collected by previous developers is not accessible for reference in the future.

Some examples of the present disclosure overcome one or more of the issues mentioned above by providing a shared debugging service that stores information collected during software debug sessions for future use. The information can include developer identities so that future developers can contact past developers for assistance. The information can also include debug session information such as developer steps, user settings, and path-to-current code specifics. In some examples, a developer can request a record of previous debugging sessions for a given piece of software and can acquire, store, or display the previously stored information to assist in a current software debug session.

A system for executing the shared debugging service can include a processing device and a memory device. The memory device includes instructions that are executable by the processing device for causing the processing device to collect information during a software debug session. The information includes a developer identity, session information, breakpoint information, or any combination of these. The information is stored in the shared debugging service. The shared debugging service is designed to be accessible during future debugging sessions. If a request is received from, for example, a client device during a future software debug session, an appropriate record of the requested information is retrieved and transmitted to the client device. The developer running the future software debug session can refer to the information for assistance during debugging, or during viewing and editing code even if a second debug session is not running. In some examples, at least portions of the information are displayable at execution breakpoints corresponding to those of the previous software debug session.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
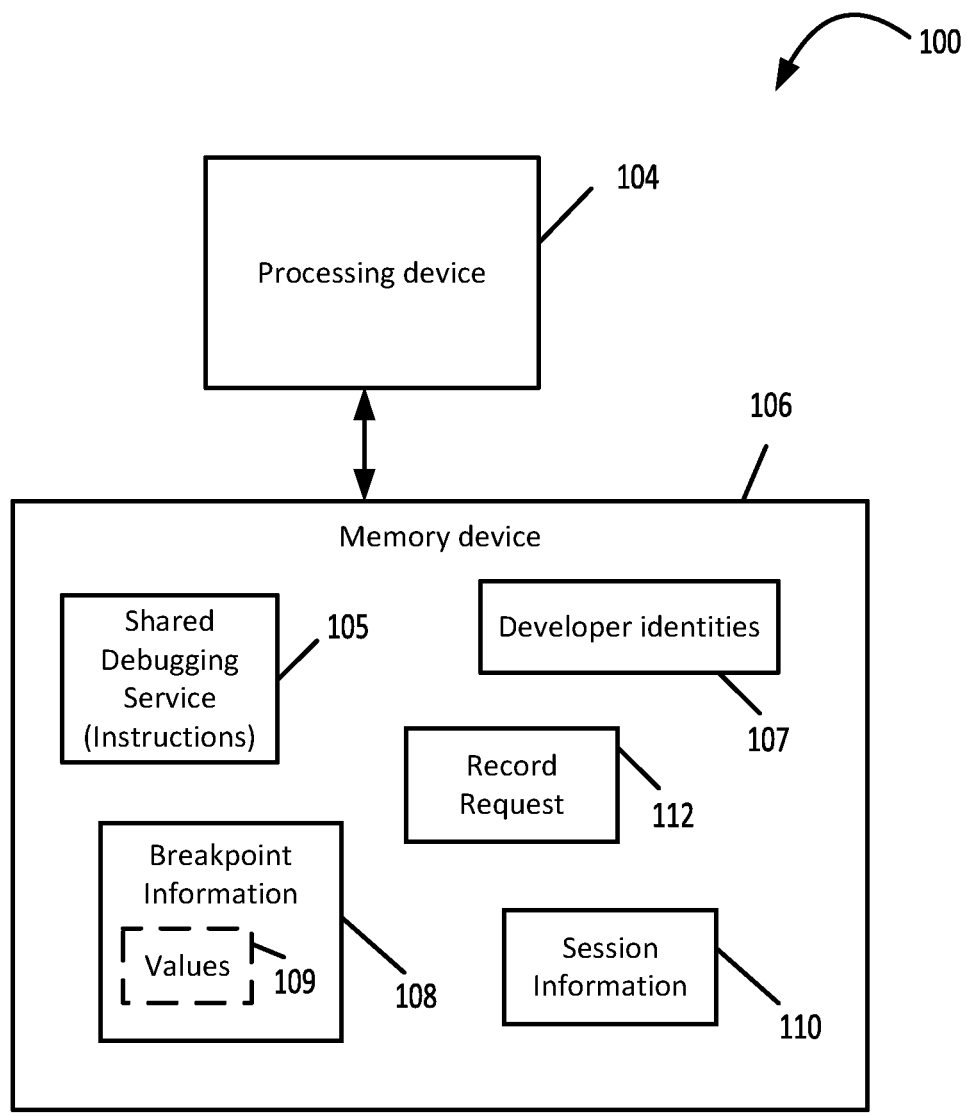
FIG. 1 is a block diagram of an example of a system that provides a shared software debugging service according to some aspects of the disclosure.

FIG. 1 is a block diagram of an example of a system 100 for providing a shared software debugging service according to some aspects of the disclosure. As an example, system 100 could be a Web server or any type of server that can be accessed from a client device that may be running a debugging console. The system 100 includes the processing device 104 that can execute computer program code, also referred to as instructions, program code, or program code instructions 105. These instructions execute the operations of the shared debugging service as described herein. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, an embedded processor, a digital signal processor, etc. The processing device 104 can execute one or more operations for the shared software debugging service.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 105. A computer-readable medium can include electronic, optical, magnetic, or other storage devices capable of providing the processing device with computer-readable instructions 105 or other program code. The memory device 106 can also include stored developer identities 107 for previous debug sessions and stored breakpoint information 108. In this example, stored breakpoint information also includes breakpoint values 109 from previous debug sessions. Detailed session information 110 is also stored in memory device 106. A current record request 112, received from a developer running a current software debug session, is also stored in memory device 106.

Figure 2:
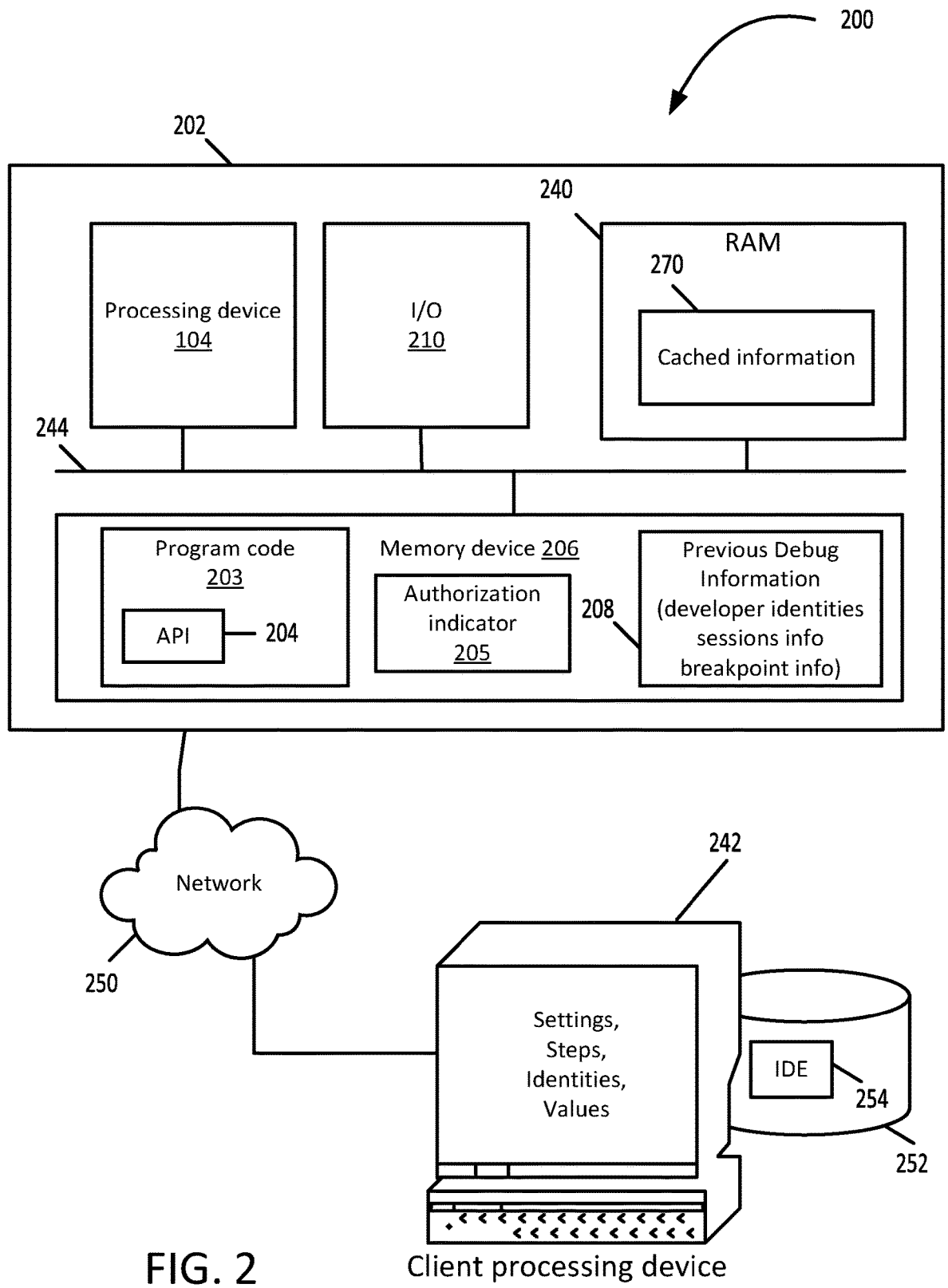
FIG. 2 is a block diagram of another example of a system that provides a shared software debugging service according to some aspects of the disclosure.

FIG. 2 is a block diagram of an example of a system 200 that provides a shared software debugging service according to some aspects of the disclosure. The system 200 is implemented by computing device 202 and includes processing device 104 that can execute computer program code 203, also referred to as instructions or program code instructions, for performing operations related to the shared software debugging service. In some examples, computing device 202 is a server such as a language services server used in software development. Processing device 104 is communicatively coupled to a memory device 206. The processing device 104 can include one processing device or multiple processing devices. Non-limiting examples of the processing device 104 include a field-programmable gate array (FPGA), an application-specific integrated circuit (ASIC), a microprocessor, etc.

The processing device 104 can execute one or more operations to provide the shared software debugging service. The processing device 104 can execute program code instructions 203 stored in the memory device 206 to perform the operations. In some examples, the instructions 203 include processor-specific instructions generated by a compiler or an interpreter from code written in any suitable computer-programming language, such as C, C++, C#, Python, etc. The instructions 203 include instructions implementing an application programming interface (API) 204 to provide previous debug session information 208 to a client processing device executing an integrated development environment (IDE), as further discussed below. Computing device 202 also includes an input/output (I/O) module or modules 210, and a random access memory (RAM) 240. A bus or interconnect 244 is also provided to allow for inter- and intra-device communications using, for example, I/O module 210.

Memory device 206 can include one memory device or multiple memory devices. The memory device 206 can be non-volatile and may include any type of memory device that retains stored information when powered off. Non-limiting examples of the memory device 206 include electrically erasable and programmable read-only memory (EEPROM), flash memory, or any other type of non-volatile memory. In some examples, at least some of the memory device can include a non-transitory computer-readable medium from which the processing device 104 can read instructions 203. A computer-readable medium can include electronic, optical, magnetic, or other storage devices capable of providing the processing device with computer-readable instructions 203 or other program code. Non-limiting examples of a computer-readable medium include magnetic disk(s), memory chip(s), ROM, random-access memory (RAM), an ASIC, a configured processor, optical storage, or any other medium from which a computer processor can read instructions 203.

The memory device 206 can also include one or more files and stored values. For example, memory device 206 can serve as a storage device for an authorization indicator 205. The authorization indicator reflects a choice made via user input as to whether breakpoint values collected during a software debug session can be freely shared with other developers. For example, if software has been debugged live and breakpoint values may include personal data such banking or medical information, there may be a need to restrict access to breakpoint values. In such a case, other breakpoint information may still be stored and made accessible in the future. Beyond breakpoint variable values, breakpoint information my include information about the state of various components of a software product or module at each breakpoint or other information regarding what the software being debugged was doing at each breakpoint.

Memory device 206 also includes information 208 from previous software debug sessions. This information includes developer identities, session information, and breakpoint information. Stored values from information 208 can be temporarily retained in RAM 240 as cached information 270 for faster access by processing device 104. This cached information can be assembled, for example, as a record to be sent to a user during a current software debug session when a record of a previous software debug session is requested. The record requested by such a user may include all available information from a previous software debug session or a subset of the stored information from the previous software debug session.

A developer running a software debug session on client processing device 242, in this example a desktop workstation, can use the client processing device to access computing device 202 over network 250 through I/O module 210, which can include a network interface (not shown). Client processing device 242 includes a non-transitory computer-readable medium 252 with program code 254 that is executed to provide an integrated development environment (IDE) for software debugging. The IDE includes the capability to collect information during a software debug session including a developer identity, session information, breakpoint information, or a combination of these or other types of information, and transmit the information to the shared debugging service running on computing device 202 by interfacing with API 204. IDE 254 also includes the capability to send a request to the shared debugging service during the software debug session for a record of the information from a previous software debug session.

Running the IDE, client processing device 242 can receive the record from the shared debugging service display the record during the second software debug session. The user interface generated by the IDE can display a list of identities for developers who have previously debugged the software of interest, breakpoint values, path-to-current code, developer steps, and user settings. In some examples, the user interface can be interactive, including the capability, as an example, to receive a selection of a developer identity by a user and display a list or details of one or more previous software debug sessions in response to the selection.

Figure 3:
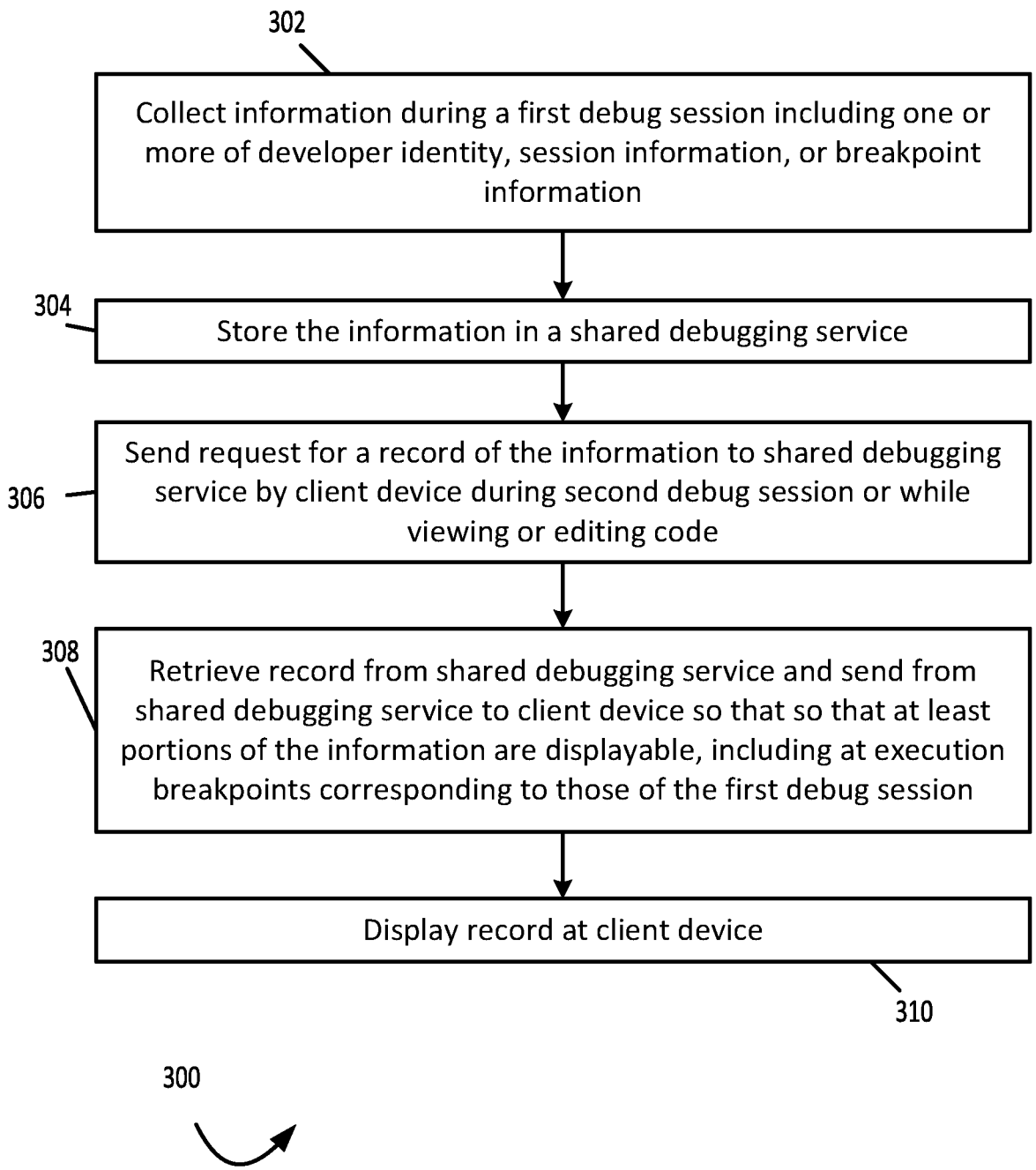
FIG. 3 is a flowchart of an example of a process for providing a shared software debugging service according to some aspects of the disclosure.

In some examples, a computing device such as processing device 104 can perform one or more of the operations shown in FIG. 3 to provide a shared software debugging service according to some aspects of the disclosure. In other examples, the processing device can implement more operations, fewer operations, different operations, or a different order of the operations depicted in FIG. 3. Process 300 of FIG. 3 is described below with reference to components discussed above.

At block 302 of FIG. 3, the processing device 104 collects information during a first software debug session. The information includes one or more of a developer identity, session information, and breakpoint information. In this example, the information will have been provided by a background process executing concurrently on a client processing device with a first software debug session executing as a foreground process. At block 304 processing device 104 stores information in the shared debugging service. At block 306, a request for a record of the first software debug session is sent to the shared debugging service. This request can be sent during a second software debug session, or outside of a debug session to allow a developer to view the information through the IDE, for example, while viewing or editing code. At block 308, the record is retrieved from the shared debugging service and transmitted from the shared debugging service to a client device. The client device may be running a web browser, a debug console, or it may be a more capable client system that includes an integrated development environment. At block 310, the record requested is displayed at the client device during the second software debug session. In this example, if a debug session is in progress, the information can be displayed by the client processing device so that at least portions of the information are displayed at execution breakpoints corresponding to those of the first software debug session.

Figure 4:
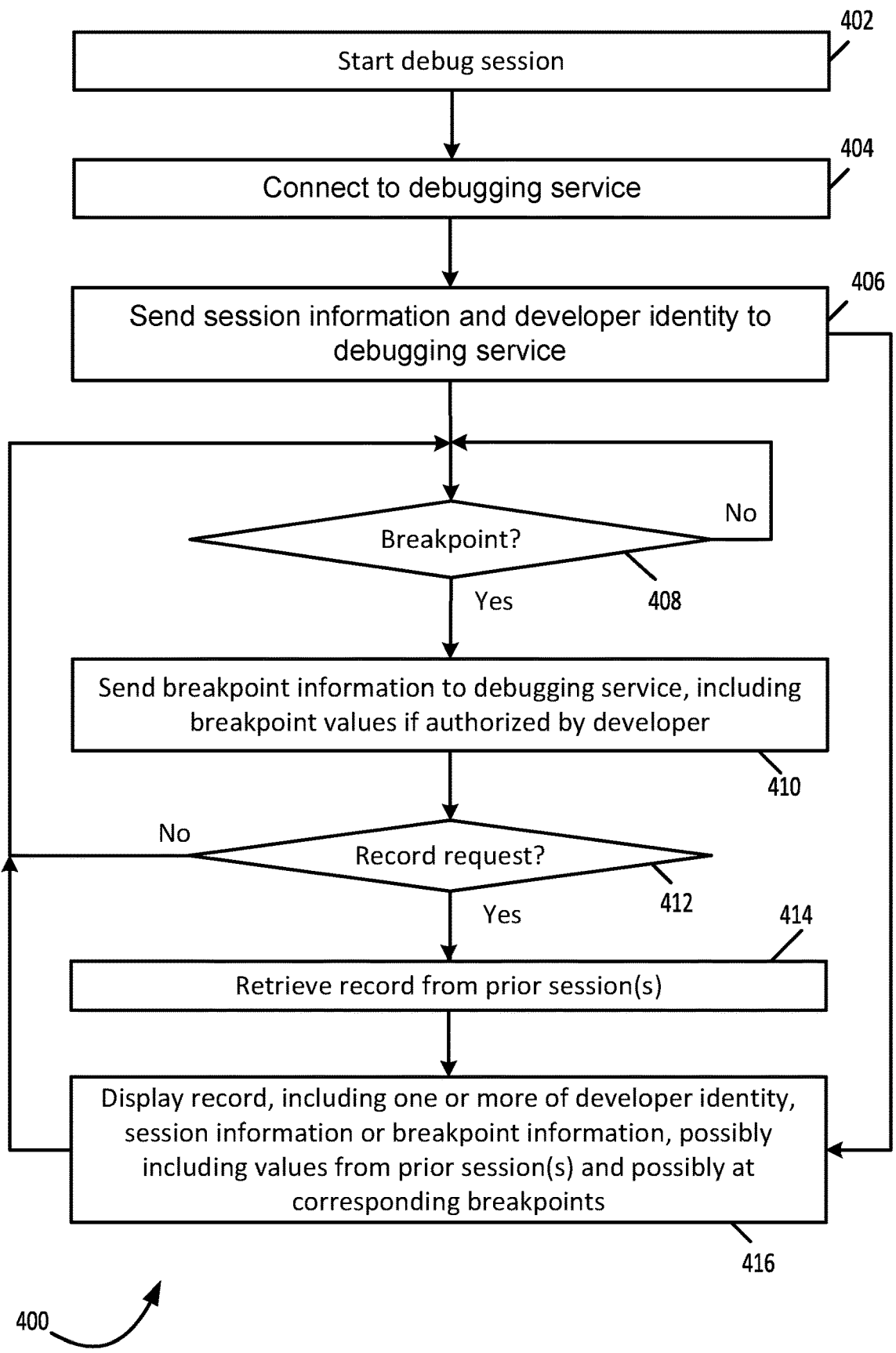
FIG. 4 is a flowchart of another example of a process for providing a shared software debugging service according to some aspects of the disclosure.

As another example, computing device 202 can perform the operations of process 400 of FIG. 4 using processing device 104 to provide a shared software debugging service according to some aspects of the disclosure. Process 400 will be described with reference to the components shown in FIG. 2. Process 400 illustrates operations where a developer is engaged in a software debug session for which debug information is being published to the shared debugging service, while at the same time, records from previous debug sessions can be retrieved and displayed. At block 402 the debug session begins. At block 404, client processing device 242 connects to the debugging service running on language services server 202. At block 406, client processing device 242 sends session information and the developer identity to the debugging service. Where session information includes sensitive information, the user can indicate that capture of the information has not been authorized at client processing device 242. This authorization input results in authorization indicator 205 being stored in memory device 206 of the server. The authorization indicator specifies whether or not certain information can be shared through the service. Sensitive information can include breakpoint values, or other items such as the identity of the developer.

The software being debugged executes until a breakpoint is reached at block 408. At that point, the breakpoint information is sent to the debugging service at block 410. If breakpoint values are authorized, the breakpoint values are sent to the debugging service and stored in memory device 206. Once all of the debug information from the current software debug session is sent to the language services server, the stored debug session information 208 includes the identity of the developer that is debugging as well as such details as the filter level of the information, operating system details, and the environment configuration. The environment configuration may include, as examples, a Ruby version, Java version, Python version, or other OS version. The information can be collected by a background service running in the IDE on the client processing device 242. Additional details reported to the background service in some examples include one or more of the path-to-current-code, the developer steps, and other data relevant at the time such as a memory snapshot, thread dump, commit id, and code version. The background service publishes the data over network 250 to the shared debugging service maintained at the language services server 202 to be accessible by developers in the future.

Records from past software debug sessions can be retrieved during the current software debug session. At block 412 of FIG. 4, if and when a record request is received from the developer inputting the request while currently debugging in the IDE, the record from the appropriate prior debug session is retrieved by the shared debugging service at block 414. At block 416, the record is displayed in the IDE. The record includes one or more of the developer identity for the previous session, session information, or breakpoint information, which may further include breakpoint values from the prior session. Breakpoint information can be displayed such that portions of the information are displayed at execution breakpoints corresponding to those of the first software debug session where the information was collected.

Unless specifically stated otherwise, it is appreciated that throughout this specification that terms such as "operations," "processing," and "computing," or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
at least one memory device including instructions that are executable by the processing device for causing the processing device to perform operations comprising:
collecting information provided by a background process executing concurrently on a client processing device with a current software debug session executing as a foreground process, the information including an identity of a developer associated with the current software debug session, developer steps, user settings and breakpoint information;
receiving an authorization indicator from the client processing device during the current software debug session, the authorization indicator configured to specify in a future software debug session whether the breakpoint information includes live breakpoint values restricted based on a presence of personal data; and
storing the information in a shared debugging service, the information being accessible during the future software debug session that is separate from the current software debug session for display by a client processing device so that at least portions of the information are displayable at execution breakpoints corresponding to those of the current software debug session.

2. The system of claim 1, wherein the operations further comprise:
receiving a request for a record of the information during the future software debug session, the record including at least some of the information;

retrieving the record from the shared debugging service in response to the request; and transmitting the record during the future software debug session so as to be displayable during the future software debug session on the client processing device.

3. The system of claim 2, wherein the breakpoint information further comprises stored breakpoint values.

4. The system of claim 2, wherein instructions further comprise an application programming interface for an integrated development environment (IDE) and wherein the record is provided through the API for display in the IDE.

5. The system of claim 4, wherein the system further comprises the client processing device configured to interactively display the identity of the developer in a list of developer identities and display details of the current software debug session in response to a selection of the identity of the developer in a user interface of the IDE.

6. A method comprising:

collecting, by a server, information sent by a client processing device during a previous software debug session, the information including an identity of a developer associated with the previous software debug session, developer steps, user settings, breakpoint information, and an authorization indicator input at the client processing device during the previous software debug session, the authorization indicator specifying whether live breakpoint values in the breakpoint information are restricted based on a presence of personal data;

storing, by the server, the information in a shared debugging service, the information being accessible at least during a future software debug session that is different than the previous software debug session;

receiving, by the server, a request from the client processing device for a record of the information, the request associated with the future software debug session; and transmitting, by the server, the record of the information to the client processing device for display so that at least portions of the record are displayable at execution breakpoints during the future software debug session corresponding to those of the previous software debug session.

7. The method of claim 6, wherein the breakpoint information further comprises stored breakpoint values.

8. The method of claim 6, wherein the information includes a path-to-current code.

9. The method of claim 6, wherein the record is provided to a debug console being executed by the client processing device.

10. The method of claim 6, wherein the record is provided through an application programming interface for display in an integrated development environment (IDE) being executed by the client processing device.

11. The method of claim 10, wherein the information includes session information from a plurality of previous software debug sessions, and the method further comprises listing the plurality of previous software debug sessions for selection in a user interface of the IDE.

12. A non-transitory computer-readable medium comprising program code that is executable by a processing device for causing the processing device to:

collect information during a previous software debug session, the information including an identity of a developer associated with the previous software debug session, developer steps, user settings, breakpoint information, and an authorization indicator input during the previous software debug session, the authorization indicator specifying whether live breakpoint values in the breakpoint information are restricted based on a presence of personal data;

transmit the information to a shared debugging service;

transmit a request to the shared debugging service during a future software debug session for a record of the information, the future software debug session being separate from the previous software debug session;

receive the record from the shared debugging service; and display at least portions of the record during the future software debug session at execution breakpoints corresponding to those of the previous software debug session.

13. The non-transitory computer-readable medium of claim 12, wherein the breakpoint information further comprises stored breakpoint values.

14. The non-transitory computer-readable medium of claim 12, wherein the information includes a path-to-current code.

15. The non-transitory computer-readable medium of claim 12, wherein the record is configured to be received through an application programming interface and displayed in an integrated development environment (IDE).

16. The non-transitory computer-readable medium of claim 15, wherein the information includes session information from a plurality of previous software debug sessions, and the program code is further executable for causing the processing device to list the plurality of previous software debug sessions for selection in a user interface of the IDE.

17. The non-transitory computer-readable medium of claim 16, wherein the program code is further executable for causing the processing device to display details of one of the plurality of previous software debug sessions in response to the selection.

* * * * *